United States Patent
Fukuta et al.

(10) Patent No.: US 9,022,099 B2
(45) Date of Patent: May 5, 2015

(54) HEAT TRANSPORT FLUID PASSAGE DEVICE WITH HYDROPHOBIC MEMBRANE

(75) Inventors: Rie Fukuta, Nisshin (JP); Yoshimasa Hijikata, Miyoshi (JP); Yoshiyasu Yamada, Chiryu (JP); Shinichi Yatsuzuka, Nagoya (JP); Kenji Takigawa, Nishio (JP); Tetsuo Toyama, Chiryu (JP)

(73) Assignee: Denso Corporation, Kariya (JP)

( * ) Notice: Subject to any disclaimer, the term of this patent is extended or adjusted under 35 U.S.C. 154(b) by 678 days.

(21) Appl. No.: 13/291,445

(22) Filed: Nov. 8, 2011

(65) Prior Publication Data
US 2012/0111549 A1 May 10, 2012

(30) Foreign Application Priority Data
Nov. 9, 2010 (JP) ................................. 2010-251091

(51) Int. Cl.
| F28F 13/18 | (2006.01) |
| F28D 15/00 | (2006.01) |
| C09K 5/10 | (2006.01) |
| F28F 1/00 | (2006.01) |
| F28F 21/00 | (2006.01) |
| F28F 23/00 | (2006.01) |

(52) U.S. Cl.
CPC . *F28D 15/00* (2013.01); *C09K 5/10* (2013.01); *F28F 1/00* (2013.01); *F28F 21/00* (2013.01); *F28F 23/00* (2013.01); *F28F 2245/02* (2013.01); *F28F 2245/04* (2013.01); *F28F 13/185* (2013.01)

(58) Field of Classification Search
CPC ....... F28F 13/18; F28F 13/182; F28F 13/185; F28F 13/187; C09K 5/08; C09K 5/10; C09K 5/14
See application file for complete search history.

(56) References Cited

U.S. PATENT DOCUMENTS

| 3,438,388 | A | * | 4/1969 | Schenck, Jr. | 137/375 |
| 3,878,885 | A | * | 4/1975 | Deronzier et al. | 165/133 |
| 4,776,391 | A | * | 10/1988 | Warner | 165/111 |
| 7,390,428 | B2 | * | 6/2008 | Davidson et al. | 252/70 |
| 7,770,809 | B2 | * | 8/2010 | Vafai et al. | 236/93 R |
| 2002/0100578 | A1 | * | 8/2002 | Withers et al. | 165/80.4 |
| 2004/0241693 | A1 | * | 12/2004 | Ricoul et al. | 435/6 |
| 2006/0108097 | A1 | * | 5/2006 | Hodes et al. | 165/80.4 |
| 2007/0210452 | A1 | * | 9/2007 | Kaneko | 257/737 |
| 2007/0251249 | A1 | * | 11/2007 | Burk | 62/121 |
| 2008/0054217 | A1 | * | 3/2008 | Hijikata et al. | 252/70 |

(Continued)

FOREIGN PATENT DOCUMENTS

| JP | 2006-016573 | 1/2006 |
| JP | 2006-017436 | 1/2006 |
| JP | 2007-031520 | 2/2007 |
| JP | 2008-060385 | 3/2008 |
| JP | 2008-189901 | 8/2008 |
| JP | 2008-311397 | 12/2008 |
| JP | 2010-077667 | 4/2010 |

OTHER PUBLICATIONS

Office Action issued Nov. 8, 2012 in corresponding Japanese Application No. 2010-251091 with English translation.

*Primary Examiner* — Allen Flanigan
(74) *Attorney, Agent, or Firm* — Harness, Dickey & Pierce, PLC

(57) ABSTRACT

A heat transport fluid passage device for a heat transport circuit has a wall defining a passage through which a heat transport fluid flows. The heat transport fluid contains a solvent made of water or an organic substance and fine particles dispersed in the solvent. A hydrophobic membrane is formed on a surface of the wall.

11 Claims, 7 Drawing Sheets

(56) References Cited

U.S. PATENT DOCUMENTS

| | | |
|---|---|---|
| 2008/0245512 A1* | 10/2008 | Fischle et al. ............... 165/133 |
| 2009/0095630 A1* | 4/2009 | Liu et al. ...................... 204/547 |
| 2010/0044018 A1* | 2/2010 | Furberg et al. .............. 165/133 |
| 2010/0095911 A1 | 4/2010 | Morita et al. |
| 2010/0096113 A1* | 4/2010 | Varanasi et al. ............. 165/133 |
| 2010/0096114 A1* | 4/2010 | Yoshida et al. .............. 165/133 |
| 2010/0115950 A1* | 5/2010 | Haje et al. ..................... 60/693 |
| 2010/0288472 A1* | 11/2010 | McCants et al. ........ 165/104.31 |

\* cited by examiner

HEAT TRANSPORT FLUID PASSAGE DEVICE WITH HYDROPHOBIC MEMBRANE

CROSS REFERENCE TO RELATED APPLICATION

This application is based on Japanese Patent Application No. 2010-251091 filed on Nov. 9, 2010, the disclosure of which is incorporated herein by reference.

FIELD OF THE INVENTION

The present invention relates to a heat transport fluid passage device defining a passage through which a heat transport fluid containing fine particles flows.

BACKGROUND OF THE INVENTION

It has been proposed to add nanoparticles having nanometer-sized diameter in a heat transport fluid that absorbs and transports heat from a heat source so as to improve heat conductivity of the heat transport fluid. Such a heat transport fluid is, for example, described in JP2007-31520A (hereinafter, the document 1) and JP2008-189901A corresponding to US2010/0095911A1 (hereinafter, the document 2).

In the heat transport fluid of the document 1, 0.05 or more mass % carbon nanotubes and cellulose derivative or sodium salt thereof are added in a base liquid such as water or ethylene glycol. In the heat transport fluid of the document 2, carbon nanotube and sodium carboxyl methyl cellulose whose average molecular weight given by GPC measuring method is 6000-30000 are added in a base liquid such as water or ethylene glycol.

When the heat transport fluid of the document 1 or the document 2 is used in a closed heat transport circuit for facilitating heat exchange, the fine particles contained in the heat transport fluid may adsorb to a surface of a passage or a device of the heat transport circuit. As a result, an adsorption layer will be formed.

Therefore, in a location where the adsorption layer is formed, a heat transfer coefficient is reduced due to the adsorption layer increasing heat-transfer resistance. Further, in the passage having a small sectional area, the adsorption layer causes clogging and an increase in pressure loss, resulting in degradation of efficiency.

SUMMARY OF THE INVENTION

The present invention is made in view of the foregoing matter, and it is an object of the present invention to provide a heat transport fluid passage device for a heat transport circuit, which is capable of restricting adsorption of fine particles contained in a heat transport fluid flowing in a passage of the device.

According to an aspect, a heat transport fluid passage device includes a wall defining a passage through which a heat transport fluid flows and a hydrophobic membrane. The heat transport fluid contains a solvent made of one of water and an organic substance and fine particles dispersed in the solvent. The hydrophobic membrane is formed on a surface of the wall.

In such a configuration, the hydrophobic membrane restricts fine particles contained in the heat transport fluid from adsorbing to the surface of the wall. Therefore, it is less likely that an adsorption layer will be formed on the surface of the wall. As such, a decrease in a heat transfer coefficient due to the adsorption layer of the fine particles is reduced. Further, an increase in pressure loss of the heat transport fluid due to the adsorption layer is reduced, as well as clogging in the passage is reduced.

For example, the hydrophobic membrane is formed on the wall where the heat transport fluid is easily stagnated and precipitation easily occurs, or where a heat transferring function is required.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENT

Hereinafter, an exemplary embodiment will be described with reference to FIGS. 1 through 8.

Figure 1:
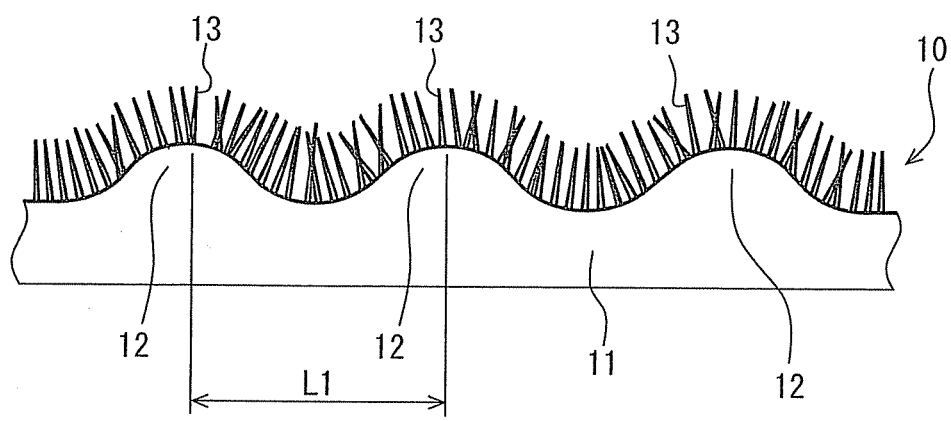
FIG. 1 is a cross-sectional view of a hydrophobic base material on which a hydrophobic membrane is formed according to an embodiment.
Figure 2A:
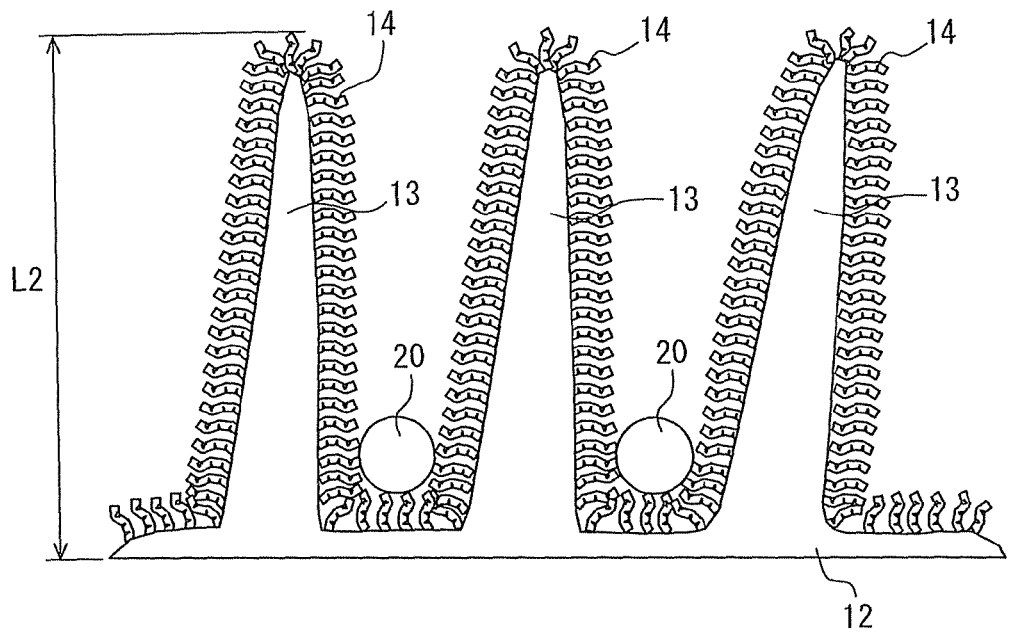
FIGS. 2A and 2B are enlarged cross-sectional views of the hydrophobic base material in a state where condensed water is generated for explaining water repellency according to the embodiment.
Figure 2B:
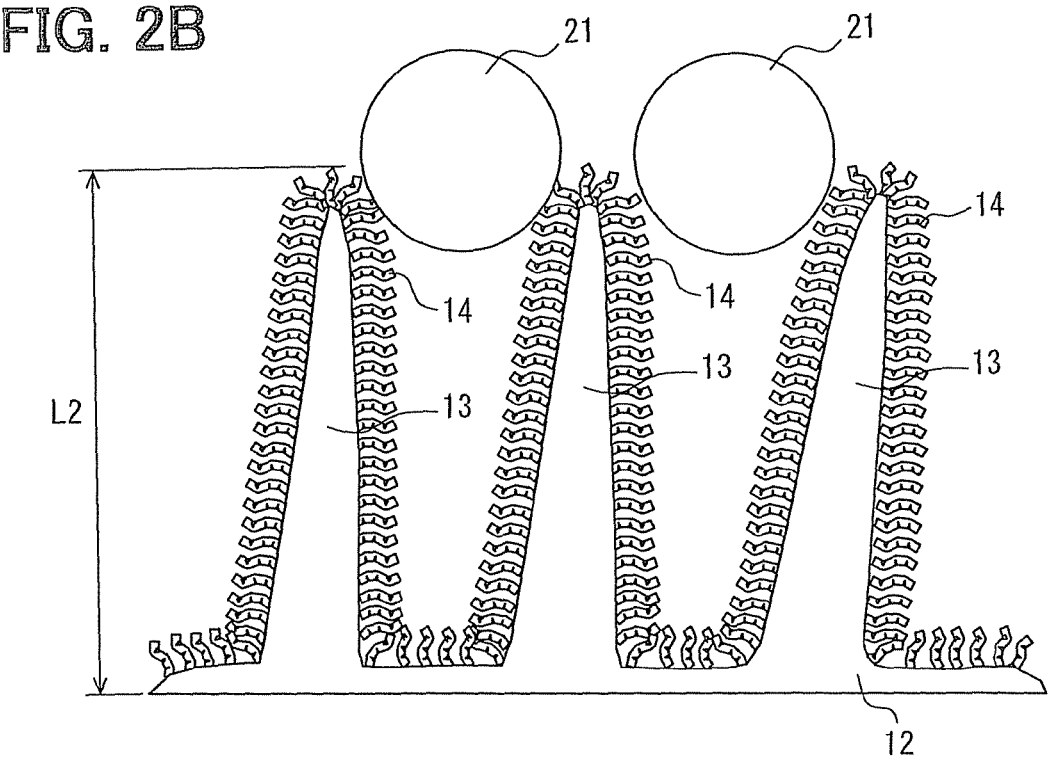

FIGS. 1, 2A and 2B illustrate an example of a hydrophobic base material 10 according to the embodiment, and the hydrophobic base material 10 is not limited to the illustrated example. Referring to FIG. 1, the hydrophobic base material 10 includes a base 11 with multiple projections 12 at a pitch L1. That is, the hydrophobic base material 10 has a concave-convex surface defined by the multiple projections 12. For example, the pitch L1 is approximately 1 micrometer (µm).

Further, multiple small projections 13 project from the concave-convex surface. The small projections 13 form an aciculate structure of the hydrophobic base material 10.

FIGS. 2A and 2B are enlarged cross-sectional views of the small projections 13 illustrated in FIG. 1. As shown in FIG.

2A, a furry portion having countless fur or hairs is formed on the surface of the small projections 13 and the surface of the projections 12 by a coating agent 14.

For example, the height or projection length L2 of the small projections 13 from the surface of the projections 12 is approximately 100 nanometers (nm). Also, a thickness (width) of the small projections 13 is, for example, approximately 10 nm.

The coating agent 14 is made of a fluorine-based coating material. The coating agent 14 forms a planing film that permits water drops to plane or slip.

Namely, the planing film includes the convex-concave surface and the aciculate structure on the convex-concave surface and has a function of sliding or slipping the water drops. The planing film provides a hydrophobic membrane of the hydrophobic base material 10.

The planing film is provided by a thin membrane that is formed by reacting and chemically bonding an organic silane having long-chain carbon fluoride chain, long-chain alkyl chain or the like, such as alkylsilane fluoride $CF_3(CF_2)_7 CH_2CH_2Si(OCH_3)_3$, which has long-chain carbon fluoride chain $CF_3(CF_2)_7$-organic silane, with a surface of the hydrophobic base material 10, such as an aluminum surface. The chemical bonding is formed by a liquid phase method.

Figure 3A:
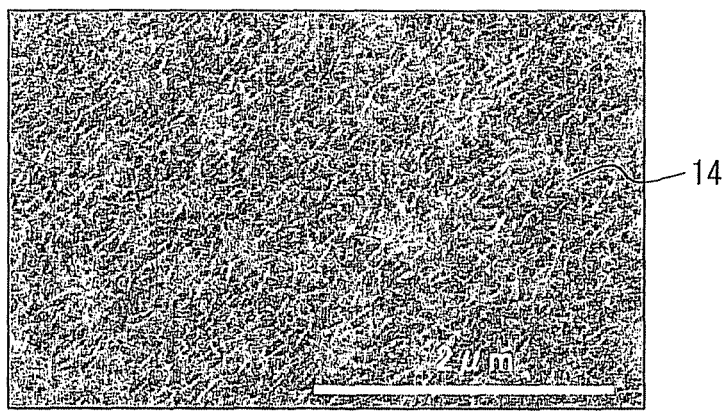
FIG. 3A is a view showing a scanning electron microscope (SEM) photograph of an enlarged surface of the hydrophobic base material according to the embodiment.
Figure 3B:
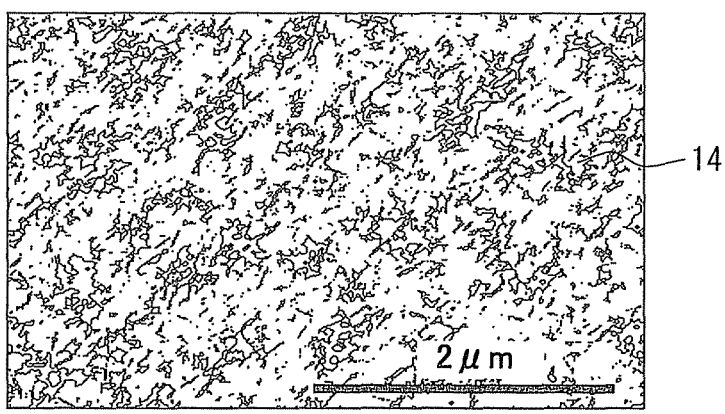
FIG. 3B is an illustrative view of the SEM photograph in FIG. 3A.
Figure 4A:
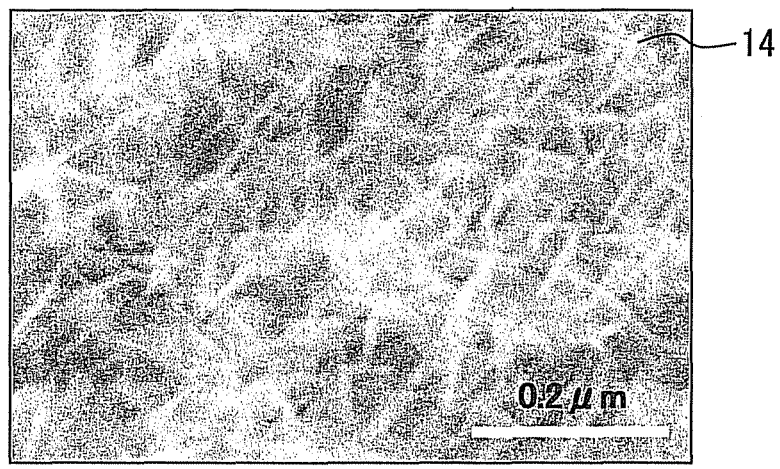
FIG. 4A is a view showing a SEM photograph of a further enlarged surface of the hydrophobic base material according to the embodiment.
Figure 4B:
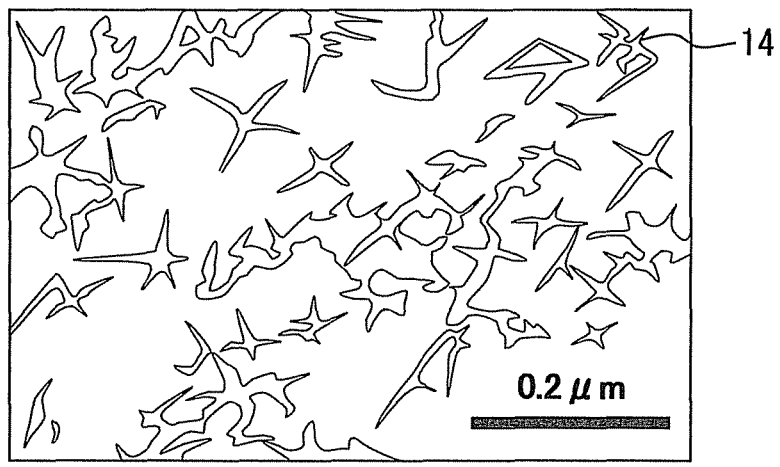
FIG. 4B is an illustrative view of the SEM photograph in FIG. 4A.

FIG. 3A is a view showing a scanning electron microscope (SEM) photograph of a surface of the hydrophobic base material 10 on which the hydrophobic membrane is formed, and FIG. 3B is an illustrative view of the SEM photograph in FIG. 3A. FIG. 4A is a view showing a SEM photograph of the surface of the hydrophobic base material 10 taken at a magnification higher than that of the SEM photograph of FIG. 3A. FIG. 4B is an illustrative view of FIG. 4A. It is to be noted that an alkyl chain is not observed in the SEM photographs in FIGS. 3A and 4A.

For example, when air is cooled and condensed water is generated on the surface of the hydrophobic base material 10, the condensed water gathers and water drops 20 are generated on the surface of the coating agent 14 forming the planing film, as shown in FIG. 2A. When the quantity of the condensed water increases, the water drop 20 becomes large, and projects from the top of the small projections 13. As shown in FIG. 2B, the water drop 20 is in a spherical shape due to a surface tension, and is in a state of being lightly mounted on the coating agent 14 on the surface of the small projections 13.

In such a state, the water drop 21 is rather small. Therefore, in an area where the coating agent 14 is not formed on the surface of the hydrophobic base material 10, or due to a polarity of hydroxyl on the surface of the hydrophobic base material 10, the water drop 20 is attracted toward the surface of the hydrophobic base material 10 with an attraction force in some extent. Therefore, the water drop 20 is still in a condition of being held on the surface of the hydrophobic base material 10. That is, in this state, the water drop 20 is less likely to slip or drop from the surface of the hydrophobic base material 10.

When the amount of the condensed water more increases from the amount shown in FIG. 2B, the water drop 20 shown in FIG. 2B further enlarges and largely projects from the top of the small projections 13. The water drop 20 is in a substantially spherical shape due to the surface tension, and is in a state of being lightly mounted on the surface of the small projections 13. When the water drop 20 enlarges to such a state, the attraction force reduces. Therefore, the water drop 20 easily slips and drops from the surface of the hydrophobic base material 10.

In this way, the water drop 20 generated on the hydrophobic base material 10 moves along the tops of the small projections 13 due to the hydrophobic property of the hydrophobic base material 10. Thus, it is less likely that the condensed water will be adsorbed or fixed. Similarly, various types of fluid slip or move along the top of the small projections 13, and thus it is less likely that the fluid will be adsorbed or fixed.

Since the fluid is not fixed to the hydrophobic base material 10, it is less likely that the fine particles contained in the fluid will be adsorbed to the surface of the hydrophobic base material 10 and an adsorption layer of the fine particles will be formed.

Next, an example of a method of forming the hydrophobic base material 10 will be described.

In the present embodiment, the hydrophobic base material 10 was formed through the following first through third steps.

<First Step: Boehmite Treatment>

An aluminum base material, which is a base of the hydrophobic base material 10, is boiled for five minutes with boiling water to form a boehmite aciculate structure on the surface of the base material. By the boehmite treatment, a fine convex-concave surface is formed on the base material.

The boehmite treatment is employed for the following two purposes.

The first purpose is to form hydroxyl on the surface of the base material, and thereby to form firm bonding in the following second step by reacting a monomolecular film formation reagent and the hydroxyl. The second purpose is to form a very fine aciculate structure by the etching during the boehmite treatment.

<Second Step: Film-Forming Treatment>

The base material after the boehmite treatment is immersed in water saturation 1,3-Bis(trifluoromethyl)benzene(F6xy) solution of 25 mM perfluorodecyltriethoxysilane (FAS-17) at a room temperature (20 degrees Celsius) for two days.

<Third Step: Post Conditioning of Film-Forming Treatment>

The base material after the second step is washed with acetone, and then dried for one hour at 80 degrees Celsius. Thus, a water-repellent base material having a water-repellent film made of a monomolecular film of $C_8F_{17}C_2H_4Si(O—)_3$, which has a fluoroalkyl group, i.e., an alkyl fluoride monomolecular film, on the surface is produced. It is to be noted that the third step is not always necessary, and may be omitted.

The hydrophobic base material 10 produced in the above process has high water repellency. For example, when the condensed water is generated on the hydrophobic base material 10 that is inclined at 30 degrees from a horizontal plane, the condensed water is slipped down as the diameter of the reaches approximately 1 millimeter (mm).

As another example of forming the hydrophobic base material 10, the following convex-concave forming treatment can be performed before the first step. A convex-concave surface is formed on the aluminum base material that provides the base of the hydrophobic base material 10 by a femtosecond laser. For example, a femtosecond laser having a pulse width of 250 fs and a center wavelength of 800 nm is scanned in parallel using a plano-convex lens or a cylindrical lens. After the convex-concave forming treatment, the first step is performed. In this way, the hydrophobic base material 10 can be produced.

In the present embodiment, the hydrophobic material 10 is employed to a heat transport fluid passage device of a heat transport circuit. The heat transport fluid passage device is any device or part of the heat transport circuit, and forms a passage through which a heat transport fluid for transporting heat from a heat source flows. For example, the hydrophobic material 10 is employed to a fin of a heat exchanger of the heat transport circuit.

Figure 5:
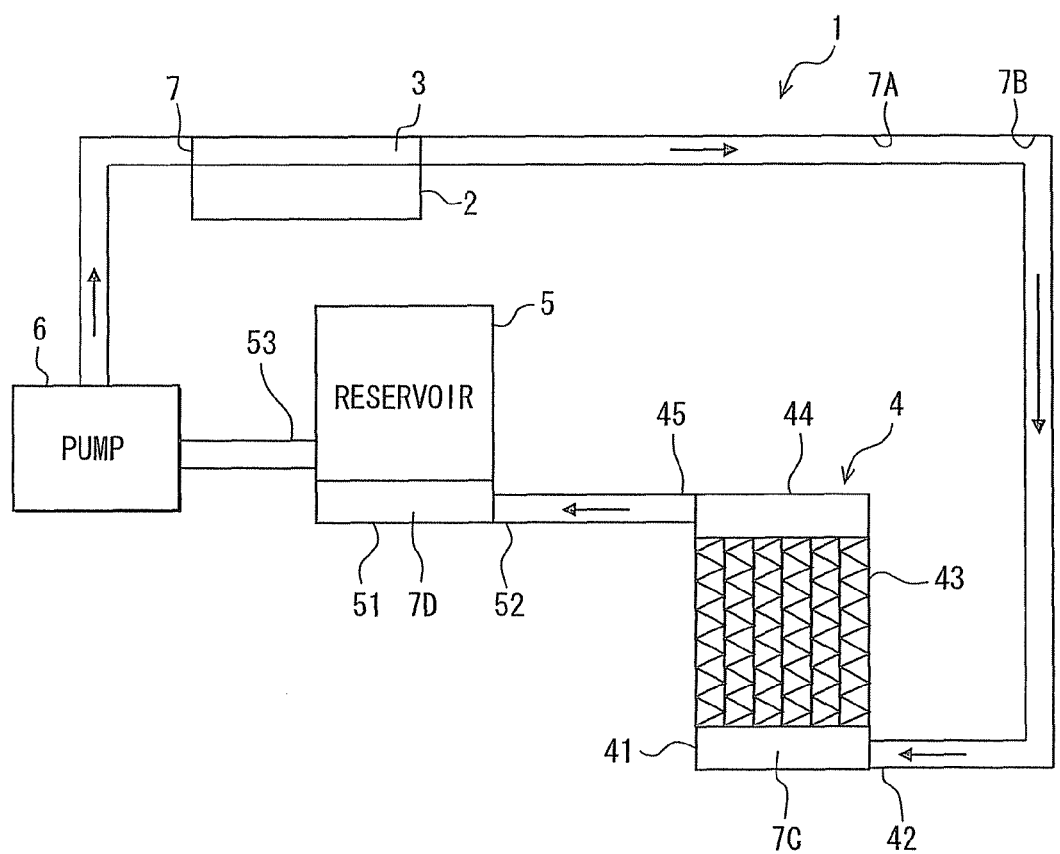
FIG. 5 is a circuit diagram of a heat transport circuit employing the hydrophobic base material according to the embodiment.
Figure 6:
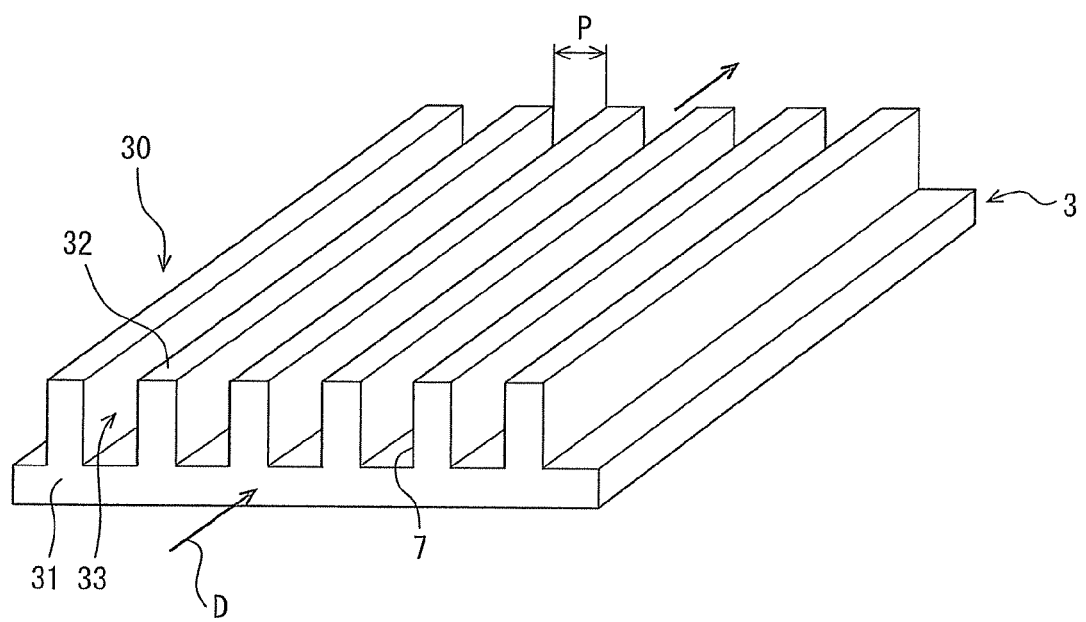
FIG. 6 is a perspective view of a fin of a heat exchanger (cooler) of the heat transport circuit having the hydrophobic base material according to the embodiment.

Hereinafter, an advantageous effect of the hydrophobic base material 10 when employed in the fin of the heat exchanger will be described with reference to FIGS. 5 through 8. FIG. 5 is a circuit diagram of a heat transport circuit 1 having the heat exchanger as the heat transport fluid passage device in which the hydrophobic base material 10 is employed. FIG. 6 is a perspective view of a fin of the heat exchanger employing the hydrophobic base material 10.

Referring to FIG. 5, in a heat transport circuit 1, the heat transport fluid for example contributes to cool an inverter for driving an electric motor, an engine, a transmission and the like. The heat transport fluid contains fine particles in a solvent. The solvent of the heat transport fluid is made of a single component, such as water. The fine particles have a heat transfer coefficient higher than that of the solvent.

Since the fine particles are dispersed in the solvent, the heat transport fluid has a favorable heat transfer coefficient and a favorable heat transport property. Thus, in the heat transport circuit 1, which performs cooling of a heat source and the like, the heat transport fluid transports and transfers heat of the heat source to an outside.

The solvent contained in heat transport fluid is composed of an aggregate of solvent molecules, and consists of water or an organic substance such as ethylene glycol or toluene. The solvent serves as a fluid dispersing the fine particles and transporting the fine particles. Alternatively, the solvent can be provided by a mixture.

The fine particles are nanometer-sized or micrometer-sized particles, and are dispersed in the heat transport fluid. The fine particles have a stick shape or a spherical shape. As an example of the fine particles, inorganic particles made of a metal such as gold (Au), silver (Ag), copper (Cu), iron (Fe), or nickel (Ni), silicon (Si), fluorine (F) or the like are used. As another example, the fine particles are made of an oxide such as alumina ($Al_2O_3$), magnesium oxide (MgO), copper oxide (CuO), ferric-oxide ($Fe_2O_3$), or titanium oxide (TiO). As further another example, the fine particles are polymer particles such as resin or carbon nanotubes.

The fine particles can have various shapes, such as stick shape, spherical shape, and polyhedral shape. The stick shape is a long and thin shape having a large aspect ratio. The aspect ratio indicates a ratio of the dimension of the long side to the dimension of the short side, that is, a ratio of the length to the thickness (width). The fine particles may be made of two or more substances.

Referring to FIG. 5, the heat transport circuit 1 includes a cooler 3, a radiator 4, a reservoir 5 and a pump 6. The cooler 3 is disposed to receive heat from an inverter 2 that drives an electric motor as an example of a heating generating device. Thus, the cooler 3 can be also referred to as an inverter cooler. The cooler 3, the radiator 4, the reservoir 5 and the pump 6 are connected into a loop through pipes.

Referring to FIG. 6, the cooler 3 includes a heat transferring member 30 and a fluid passage 33. The heat transferring member 30 is, for example, made of aluminum, copper or the like to transfer heat from the inverter 2. The fluid passage 33 is disposed such that the heat transport fluid flows on a periphery of the heat transferring member 30. As flowing in the fluid passage 33, the heat transport fluid contact fins 32 of the heat transferring member 30 and absorbs heat from the fins 32, thereby to cool the inverter 2. In the heat transport circuit 1, the cooler 3 is connected through the pipes such that an inlet of the cooler 3 is in communication with pump 6 and an outlet of the cooler 3 is in communication with the radiator 4.

As shown in FIG. 6, the heat transferring member 30 has a base portion 31 that receives heat from the inverter 2 and the fins 32 projecting from the base portion 31. For example, the fins 32 are integral with the base portion 31.

The fins 32 are arranged at a predetermined interval P, such as in a range between 0.1 millimeter and several millimeters. The fluid passage 33 includes multi-layered passage portions that are provided between adjacent fins 32 and are arranged in a direction perpendicular to a longitudinal direction of the fins 32, that is, in a direction perpendicular to a flow direction D of the heat transport fluid.

The radiator 4 includes a heat exchanging core part 43, a lower tank 41, and an upper tank 44. The core part 43 includes tubes in which the heat transport fluid flows and fins for increasing a heat transfer area. The tubes and the fins are alternately stacked. The lower tank 41 provides an inlet tank and the upper tank 44 provides an outlet tank. That is, the heat transport fluid flowing out from the cooler 3 is introduced in the lower tank 41, and is then distributed into the tubes. The heat transport fluid passing through the tubes are collected in the upper tank 44 and is discharged from the radiator 4.

An inlet pipe 42 is coupled to the lower tank 41. The inlet pipe 41 is in communication with the cooler 3. An outlet pipe 45 is coupled to the upper tank 44. The outlet pipe 45 is in communication with a lower container 51 of the reservoir 5.

The reservoir 5 is an auxiliary tank that can store the heat transport fluid flowing in the heat transport circuit 1. An inlet pipe 52 is coupled to the lower container 51, and an outlet pipe 53 is coupled to the reservoir 5 at a location higher than the inlet pipe 52. The inlet pipe 52 is in communication with the upper tank 44 of the radiator 4. The outlet pipe 53 is in communication with the pump 6.

The pump 6 is an electric fluid circulating device that generates a driving force to forcibly circulate the heat transport fluid in the heat transport circuit 1. As the pump 6 is activated, the heat transport fluid 1 moves in the heat transport circuit 1, thereby to begin to cool the inverter 2. The heat transport fluid driven by the pump 6 absorbs the heat of the inverter 2 through the heat transferring member 30 of the cooler 3, and transports the heat to the radiator 4.

In the radiator 4, the heat transport fluid is distributed into the tubes of the core part 43 from the lower tank 41. As flowing upward in the tubes, the heat transport fluid radiates the heat to air passing around the tubes and the fins.

The heat transport fluid cooled in the core part 43 is collected in the upper tank 44, and is then introduced into the reservoir 5. Further, the heat transport fluid is drawn into the pump 6.

After being discharged from the pump 6, the heat transport fluid absorbs heat of the inverter 2 through the cooler 3 again. Then, the heat transport fluid is cooled in the radiator 4 by radiating the heat to the air. In this way, while the pump 6 is in operation, the heat transport fluid 1 circulates in the heat transport fluid 1, and repeats the heat absorption and the heat radiation.

When the pump 6 is stopped, the circulation of the heat transport fluid is stopped. Therefore, a substance including the fine particles in the heat transport fluid becomes solid and causes precipitation. It is difficult to thoroughly avoid the precipitation because of gravity. The substance dispersed in the solvent of the heat transport fluid, such as the fine particles, is precipitated, the fine particles are more likely to adsorb to a wall or a surface of the heat transport circuit 1 at a precipitated portion than a case without causing precipitation.

If the fine particles are adsorbed and accumulated at the precipitated portion, an adsorption layer is formed. Because the adsorption layer results in heat resistance, a heat transfer coefficient of the heat transport fluid is reduced, as compared with a case without having the adsorption layer.

If the heat transfer coefficient of the heat transport fluid is reduced, the heat absorption in the cooler 3 and the heat radiation in the radiator 4 are not sufficiently carried out. Therefore, it is difficult to sufficiently transport the heat. That is, it is difficult to achieve a desired cooling capacity in the heat transport circuit 1.

In general, the fine particles are likely to be adsorbed to the passages and devices of the heat transport circuit 1. Therefore, the hydrophobic membrane as mentioned above is formed on the wall of the heat transport fluid 1 that contacts the heat transport fluid and where the adsorption layer of the fine particles is easily formed.

For example, the hydrophobic membrane is formed on an inner surface of a pipeline 7A, an inner surface of a bent portion 7B of the pipeline 7A, an inner surface of the lower tank 41 forming a chamber 7C, an inner surface of the lower container 51 forming a chamber 7D, a surface of the fin 32 of the cooler 3, a wall surface of the fluid passage (inner passage) 33 of the cooler 3, an inner surface of an inlet port 7 of the cooler 3, and the like.

In other words, each of the pipeline 7A, the radiator 4 and the reservoir 5 is appreciated as the heat transport fluid passage device forming the passage where the heat transport fluid containing the fine particles flows, and having an adsorption restricting function that permits the heat transport fluid to slip from the surface of the device.

The wall surface of the fluid passage 33 on which the hydrophobic membrane is formed faces a part of or the entirety of an area where the heat transport fluid flows inside of the cooler 3. The inlet port 7 of the cooler 3 provides an inlet of the cooler 3 for allowing the heat transport fluid to flow into the cooler 3. For example, the inner surface of the inlet port 7 corresponds to the surface of an inlet end of the fluid passage 33.

Further, it is advantageous to form the hydrophobic membrane on the surface of the lower portion and the corner portion of each device where the adsorption layer is apt to be easily formed. In other words, it is advantageous to form the hydrophobic membrane on the surface of the portion where the flow of the heat transport fluid is easily stagnated and the fine particles and the like are easily adsorbed.

Further, the heat transfer coefficient in the cooler having the fins with the hydrophobic membrane as the present embodiment and the heat transfer coefficient in the cooler without having the hydrophobic membrane as a comparative example were tested. In the cooler of the present embodiment, the hydrophobic membrane is formed on the surface of the fin as the hydrophobic base material 10.

Figure 7:
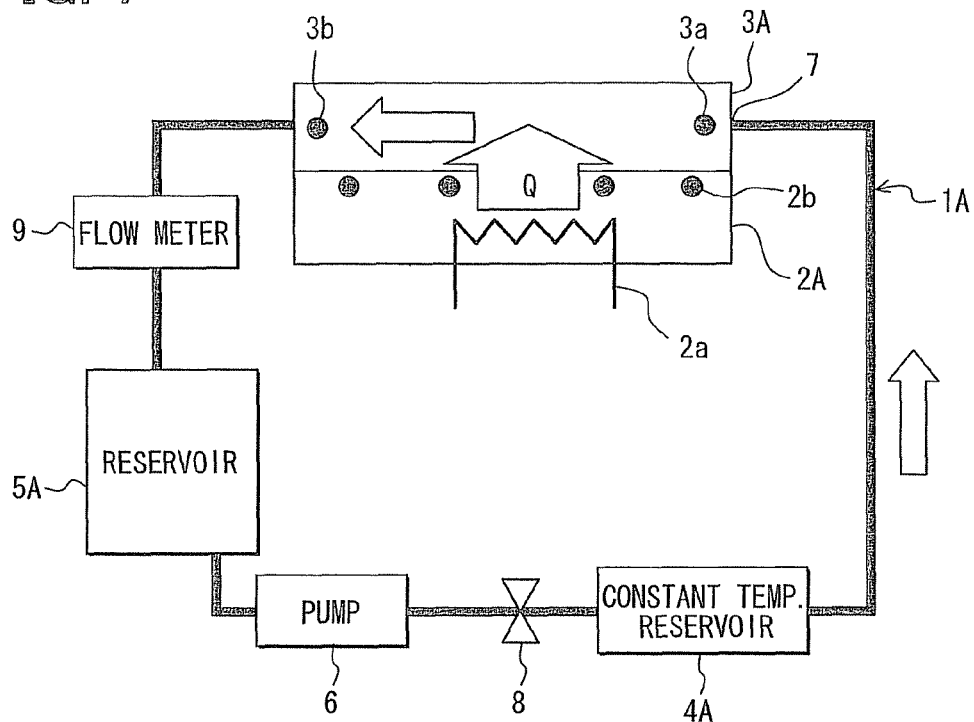
FIG. 7 is a schematic diagram of an experimental apparatus used for verifying a heat transfer coefficient with regard to a heat exchanger (cooler) with the hydrophobic base material according to the embodiment and a heat exchanger (cooler) without having the hydrophobic base material as a comparative example.
Figure 8:
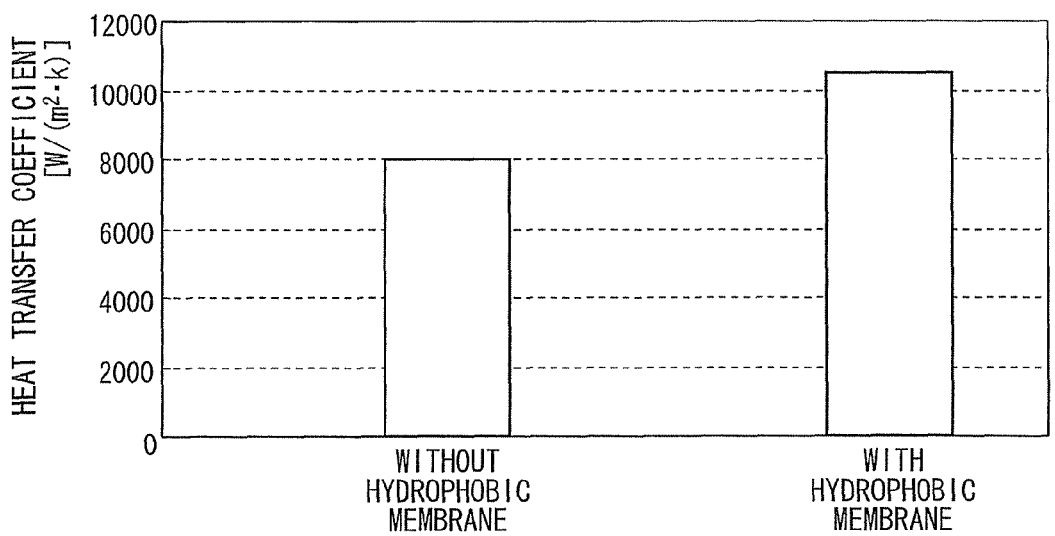
FIG. 8 is a graph illustrating a heat transfer coefficient of the heat exchanger with the fin having the hydrophobic base material according to the embodiment and a heat transfer coefficient of the heat exchanger of the comparative example.

Hereinafter, an experimental apparatus used in the test and the test result will be described with reference to FIGS. 7 and 8. FIG. 7 is a schematic diagram of a heat transport circuit 1A as the experimental apparatus used in the test. FIG. 8 is a graph showing the heat transfer coefficient of the cooler of the present embodiment and the heat transfer coefficient of the cooler of the comparative example.

Referring to FIG. 7, the heat transport circuit 1A includes a cooler 3A, a flow-meter 9, a reservoir 5A, a pump 6, a valve 8 for controlling a flow rate, and a constant temperature reservoir 4A for cooling the heat transport fluid. The cooler 3A, the flow meter 9, the reservoir 5A, the pump 6, the valve 8 and the constant temperature reservoir 4A are connected into a loop shape. A heater 2a is employed as a heat generating member. The cooler 3A is disposed to receive heat of the heater 2a through a heat transferring member 2A made of copper.

An inlet thermoelectric couple 3a is disposed at a fluid inlet of the cooler 3A to detect the temperature of the heat transport fluid flowing into the cooler 3A, such as an inlet fluid temperature TLin. Also, an outlet thermoelectric couple 3b is disposed at a fluid outlet of the cooler 3A to detect the temperature of the heat transport fluid flowing out from the cooler 3A, such as an outlet fluid temperature TLout.

Multiple thermoelectric couples 2b, such as four thermoelectric couples, are disposed on the surface of the heat transferring member 2A at equal intervals from an upstream end to a downstream end with respect to a flow of the heat transport fluid to detect the temperature of the wall of the heat transferring member 2A, such as wall temperatures Twa1, Twa2, Twa3 and Twa4.

The cooler 3A of the present embodiment and the cooler 3A of the comparative example have the same size and the same shape, as shown in FIG. 6, but are different because only the cooler 3A of the present embodiment has the hydrophobic membrane on the surface of the fin 32.

In each of the heat transport circuit 1A in which the cooler 3A of the present embodiment is employed and the heat transport circuit 1A in which the cooler 3A of the comparative example is employed, the coefficient of heat transfer from the heat transferring member 2A to the heat transport fluid was calculated through the following equations (1) through (3). In the test, the heat transport fluid is a 1 vol % carbon nanotube fluid, and is circulated at a flow velocity of 0.4 m/sec. Also, the heating quantity of the heater 2a is 160 W.

The heat transport fluid was circulated for a predetermined period of time (e.g., two hours). The heat transfer coefficient hl of a location corresponding to each of n positions (e.g., four positions) where the thermoelectric couples 2b were disposed was calculated, and an average of the heat transfer coefficients hl of the n positions was calculated as the heat transfer coefficient h. Further, the temperature of the heat transport fluid at each of the n positions was calculated by an interpolation method using the inlet fluid temperature TLin and the outlet fluid temperature TLout.

$$\Delta T = Twan - TLn \quad (1)$$

$$hl = Q/(\Delta T \cdot A) \quad (2)$$

$$h = (1/n) \cdot \Sigma hln \quad (3)$$

It is to be noted that n is from one to four, A represents a heat transferring area between the heat transferring member 2A and the cooler 3A, and Q represents the quantity of heat generated from the heater 2a.

As the test result, the heat transfer coefficient h of the cooler 3A of the comparative example without having the hydrophobic membrane (planing film) was 8000 W/(m$^2$·K), and the heat transfer coefficient h of the cooler 3A of the present embodiment having the hydrophobic membrane (planing film) was approximately 10500 W/(m$^2$·k), as shown in FIG. 8.

It is appreciated that the difference of the heat transfer coefficient h between the present embodiment and the comparative example is caused by the existence of the hydrophobic membrane (planing film). That is, the difference of the adsorption amount of the fine particles on the heat transferring surface occurs, and thus the local heat transfer coefficient hl is reduced due to the adsorption layer being the thermal resistance.

Further, the heat transport fluid was circulated to the cooler 3A of the present embodiment and the cooler 3A of the comparative example at a maximum flow velocity of 0.4 m/sec for two hours. As a result, in the cooler 3A of the comparative example, it was visible to the naked eyes that the carbon nanotubes and the like as the fine particles were adsorbed and accumulated at the inlet and the like of the fluid passage.

An advantageous effect of the present embodiment will be hereinafter described.

In the present embodiment, the hydrophobic membrane is formed on the wall surface of the device of the heat transport circuit 1 where the heat transport fluid contacts. For example, the hydrophobic membrane is formed on the wall surface where the heat transport fluid is easily stagnated and the precipitation easily occurs and/or where the heat transferring function is required. Since the hydrophobic membrane restricts the fine particles, such as nanoparticles, from adsorbing to the wall surface, it is less likely that the adsorption layer of the fine particles, which causes the fluid resistance and the thermal resistance, will be formed.

In such a case, even if the heat transport circuit 1 is used for a long time, it is less likely that the adsorption layer will be formed. As such, a desirable heat exchanging capacity can be maintained. Further, the pressure loss and clogging are reduced.

The hydrophobic membrane is provided by the planing film in which the convex-concave surface having the aciculate structure is covered with alkylsilane fluoride. The planing film coated with the alkylsilane fluoride is formed on the wall surface. That is, a contact surface having the aciculate structure on the convex-concave surface as well as the hydrophobicity of the alkylsilane fluoride is formed. Therefore, the effect of slipping the heat transport fluid is further improved. Accordingly, the adsorption of the fine particles to the wall surface of the device is further reduced, and the desired heat exchanging capacity can be maintained for a further long time.

The hydrophobic membrane is formed on the surface of the fin of the heat exchanger of the heat transport circuit 1, the fin being an important component having a heat transferring function. Since the hydrophobic membrane restricts the fine particles such as nanoparticles in the heat transport fluid from being adsorbed to the wall surface, it is less likely that the adsorption layer of the fine particles will be formed on the fins.

Since the fluid resistance and the thermal resistance due to the adsorption layer are reduced, the heat exchanging capacity of the heat exchanger is maintained for a long time. Further, the pressure loss and clogging while the heat transport fluid flows around the fins are reduced.

In the case where the hydrophobic membrane is formed on the surface of the fin 32 of the cooler 3, the hydrophobic membrane restricts the fine particles from being adsorbed to the surface of the fin 32. Therefore, it is less likely that the adsorption layer of the fine particles will be formed on the surface of the fin 32. Since the fluid resistance and the thermal resistance due to the adsorption layer are reduced, the cooling capacity of the inverter 2 is maintained for a long time. Further, the performance and the life of the inverter 2 are maintained for a long time.

In the case where the hydrophobic membrane is formed on the wall surface of the fluid passage 33 of the cooler 3 for cooling the inverter 2, the hydrophobic membrane restricts the fine particles from being adsorbed to the wall surface of the fluid passage 33 of the cooler 3. Therefore, it is less likely that the adsorption layer will be formed on the wall surface of the fluid passage 33. As a result, the flow of the heat transport fluid in the fluid passage 33 is facilitated, and the fluid resistance is reduced. Therefore, the cooling capacity of the inverter 2 is maintained for a long time. Further, the performance and the life of the inverter 2 are maintained for a long time.

In the case where the hydrophobic membrane is formed on the surface of the inlet port of the cooler 3, the hydrophobic membrane restricts the fine particles from adsorbing to the fluid inlet of the cooler 3. Therefore, it is less likely that the adsorption layer will be formed at the fluid inlet of the cooler 3. As a result, the flow of the heat transport fluid at the fluid inlet of the cooler 3 is facilitated, and the fluid resistance is reduced. Therefore, the cooling capacity of the inverter 2 is maintained for a long time. Further, the performance and the life of the inverter 2 are maintained for a long time.

The hydrophobic membrane is formed on the wall surface of the corner portion of the fluid passage in the cooler 3 where the heat transport fluid is easily stagnated and thus the precipitation easily occurs. In this case, the hydrophobic membrane restricts the fine particles from being adsorbed to the corner portion. Therefore, it is less likely that the adsorption layer will be formed at the corner portion. Accordingly, an increase in the pressure loss at the corner portion due to the adsorption layer is reduced. Also, the fluid resistance and the thermal resistance are reduced. As a result, the cooling capacity of the inverter 2 is maintained for a long time. Further, the performance and the life of the inverter 2 are maintained for a long time.

The hydrophobic membrane is formed on an inner surface of the chamber that is provided at the lower part of the tank where the heat transport fluid flows. The precipitation easily occurs at the bottom of the chamber due to gravity when the circulation of the heat transport fluid is stopped such as when the pump 6 is stopped. In this case, the hydrophobic membrane restricts the adsorption layer from being formed due to the precipitation. Accordingly, the pressure loss at the location where the precipitation easily occurs is reduced. Further, the fluid resistance in the heat transport circuit 1 is reduced.

The hydrophobic membrane is formed on the inner surface of the pipeline 7A and the inner surface of the bent portion 7B of the pipeline 7A. In the pipeline 7A and the bent portion 7B, the precipitation easily occurs due to gravity when the circulation of the heat transport fluid is stopped such as when the pump 6 is stopped. In this case, the hydrophobic membrane restricts the adsorption layer from being formed due to the precipitation. Accordingly, the pressure loss at the location where the precipitation easily occurs is reduced. Further, the fluid resistance in the heat transport circuit 1 is reduced.

Other Embodiments

The exemplary embodiment of the present invention is described hereinabove. However, the present invention is not limited to the above described exemplary embodiment, but may be implemented in various other ways without departing from the spirit of the invention.

The solvent of the heat transport fluid is not limited to the above described example. Alternatively, the solvent of the heat transport fluid may be any other organic solvent, such as toluene, hexane, diethyl ether, chloroform, ethyl acetate, tetrahydrofuran, methylene chloride, acetone, acetonitrile, N,N-dimethylformamide, dimethyl sulfoxide, butanol acetate, 2-propanol, 1-propanol, ethanol, methanol, pseudo-acid, or the like.

Also, the solvent of the heat transport fluid may be made of two kinds of components. As an example of one of the two kinds of components, a liquid that has a freezing point depression function may be used. For example, water is used as the solvent, and potassium acetate, sodium acetate, or the like can be used as a freezing point depressant. In such a case, the freezing point of the heat transfer fluid is lowered. Therefore, the device can be used in a cold district. Furthermore, if necessary, the heat transport fluid can contain an antirust agent and/or an anti-oxidant agent as an additive, in addition to the freezing point depressant. If it is not necessary to lower the freezing point of the heat transport fluid, two or more kinds of solvents without containing the freezing point depressant can be used.

In the case of performing the convex-concave forming treatment before the boehmite treatment, the convex-concave surface may be formed by the following method in place of the method using the femtosecond laser.

For example, the convex-concave surface is formed by grinding the aluminum base material with #100 water-resistance sandpaper (e.g., Fuji Star by Sankyo-Rikagaku Co., Ltd).

In the heat transport circuit 1, an object to be cooled is not limited to the inverter 2, but may be any other devices, such as a CPU of a control device.

Additional advantages and modifications will readily occur to those skilled in the art. The invention in its broader term is therefore not limited to the specific details, representative apparatus, and illustrative examples shown and described.

What is claimed is:

1. A heat transport fluid passage device for a heat transport circuit through which a heat transport fluid flows, the heat transport fluid containing a solvent made of one of water and an organic substance and fine particles dispersed in the solvent, the heat transport fluid passage device comprising:
    a wall defining a passage through which the heat transport fluid flows, the wall having a convex-concave surface defined by a plurality of first projections;
    an aciculate structure including a plurality of second projections being smaller than the first projections and projecting from the convex-concave surface; and
    a hydrophobic membrane having a furry portion and being disposed on the convex-concave surface of the wall and on surfaces of the second projections.

2. The heat transport fluid passage device according to claim 1, wherein
    the wall forms an inner passage of an inverter cooler of the heat transport circuit, and
    the hydrophobic membrane is disposed on the surface of the inner passage of the inverter cooler.

3. The heat transport fluid passage device according to claim 2, wherein the wall forms the inner passage at an inlet port of the inverter cooler.

4. The heat transport fluid passage device according to claim 1, wherein
    the wall forms an inner passage of an inverter cooler of the heat transport circuit, the inner passage including a corner portion, and
    the hydrophobic membrane is disposed on the surface of the corner portion of the inner passage.

5. The heat transport fluid passage device according to claim 1, wherein
    the wall forms an inner wall of a chamber that is disposed at a lower part of a tank of the heat transport circuit through which the heat transport fluid flows, and
    the hydrophobic membrane is disposed on the surface of the inner wall.

6. The heat transport fluid passage device according to claim 1, wherein
    the wall forms an inner wall of a pipeline of the heat transport circuit, and
    the hydrophobic membrane is disposed on the surface of the inner wall of the pipeline.

7. The heat transport fluid passage device according to claim 6, wherein
    the inner wall of the pipeline includes a corner portion, and
    the hydrophobic membrane is formed on the inner wall of the corner portion of the pipeline.

8. The heat transport fluid passage device according to claim 1, wherein
    the wall is included in a fin of a heat exchanger of the heat transport circuit, and
    the hydrophobic membrane is formed on the surface of the fin.

9. The heat transport fluid passage device according to claim 1, wherein the hydrophobic membrane is provided by a planing film made of alkylsilane fluoride coating the convex-concave surface and the surfaces of the second projections of the aciculate structure.

10. The heat transport fluid passage device according to claim 9, wherein the wall is made of aluminum, and the aciculate structure is a boehmite aciculate structure.

11. A heat transport fluid passage device for a heat transport circuit through which a heat transport fluid flows, the heat transport fluid containing a solvent made of one of water and an organic substance and fine particles dispersed in the solvent, the heat transport fluid passage device comprising:
    a wall defining a passage through which the heat transport fluid flows, the wall being made of aluminum, and a surface of the wall having a plurality of first projections;
    an aciculate structure including a plurality of second projections being smaller than the first projections and projecting from the surface of the wall, the aciculate structure being a boehmite aciculate structure; and
    a hydrophobic membrane having a furry portion disposed on the surface of the wall and surfaces of the second projections.

* * * * *